2,841,624
Patented July 1, 1958

2,841,624

PROCESS FOR PRODUCING ALKYLATED PHENOLS

Douglas G. Norton and Rupert C. Morris, Berkeley, Calif., assignors to Shell Development Company, New York, N. Y., a corporation of Delaware No Drawing. Application May 8, 1957
Serial No. 657,724

14 Claims. (Cl. 260—624)

This invention relates to a process for preparation of 2,4,6-trialkyl phenols. More particularly it relates to a novel process for cleaving certain ethers resulting in products of the type described.

It is known that various alkylated phenols are useful as anti-oxidants and many such compounds and methods for preparing them have been described. Recently, there have become available certain ethers which may be prepared as principal reaction products or may be obtained as by-products from the alkylation of phenolic compounds. These ethers are termed 2,6-di-alkyl-4-alkoxyalkyl phenols having the formula

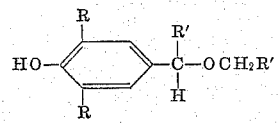

wherein each R is an alkyl group and each R' is selected from hydrogen and lower alkyl. It has now been found that ethers of the type described above may be treated by a novel process whereby they are cleaved to produce high yields of useful products.

It is an object of this invention to provide a novel process for the cleaving of certain ethers. It is another object of this invention to provide a novel process for cleaving certain ethers whereby a substantially homogeneous product is obtained. It is yet another object of this invention to provide a novel process for the preparation of para-alkyl-2,6-dialkyl phenols using certain para-ethers of phenolic compounds as starting materials. It is yet another object of this invention to provide a novel and useful process for reacting para-ethers of phenolic compounds to produce polyalkyl phenols which are useful as anti-oxidants. Other objects will become apparent as the description proceeds.

These and other objects are accomplished by the process which comprises reacting an ether of the formula

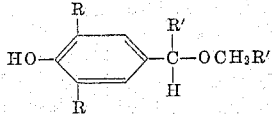

wherein each R is an alkyl group and each R' is selected from the group consisting of hydrogen and lower alkyl, said reaction being conducted in the presence of an alcohol and a base at temperatures ranging from about 150° C. to below temperatures at which substantial decomposition occurs.

Because the process of this invention is conducted at elevated temperature, it is necessary to use elevated pressures and accordingly the reaction may be conducted in any suitable pressure vessel. The process merely requires that the reactants and reagents be charged to the reaction vessel and heat be applied to the desired reaction temperature. Because the process of this invention is conducted so easily and simply, continuous, intermittent or batch operations may be employed. After the reaction is complete the reaction product is removed from the reaction vessel and the desired product is separated by any conventional means.

The alcohol, which is required for the process of this invention, serves two purposes. On the one hand it is a solvent but, more important, it is a reactant that participates in the reaction. Evidence that the alcohol participates in the reaction is amply indicated by the finding the alcohol is consumed during the course of the reaction. It is also found that any primary alcohol can participate in the reaction. The process of this invention is most suitably conducted when the alcohol contains up to 6 carbon atoms. Such alcohols include methanol, ethanol, propanol, isobutanol, hexanol and the like. In the preferred embodiment alcohols having 1 to 3 carbon atoms are preferred as such alcohols react most readily, produce the highest yields, and result in products which are of greatest utility as antioxidants.

The quantity of the alcohol that is employed in the process will vary depending upon a number of factors. In general, it may be stated that the quantity ranges from at least a stoichiometric amount needed to provide the alkyl groups in the para-position of the final product to about 50 moles, based on the amount of the starting ether. In actual practice there is needed an excess over the stoichiometric amount in order to assure maximum conversions and accordingly 10 to 50 moles of the alcohol are preferably employed with about 15 to 35 moles being particularly preferred. Among the variables which require consideration in selecting the quantity of the alcohol to be employed there may be mentioned the number of carbon atoms in the alcohol, the temperature of the reaction, the quantity of base or basic-acting material, and the like, with the first being the most important. In general, greater quantities of alcohol are required with an increasing number of carbon atoms in the alcohol or where the carbon content of the radicals indicated by the R' is higher. It is a particular advantage of the present process that the alcohol serves a dual purpose, as indicated above, because any excess may be employed without incurring any substantial disadvantage except that care should be taken to avoid unnecessarily large excesses as such excesses must ultimately be separated.

The base, or basic acting material is essential to the process and if it is not present the above-described process will not take place. The quantity of the base which is employed will likewise vary depending upon several factors, such as the nature of the alcohol employed in the process, the temperature at which the reaction is conducted, and the strength of the base. In general, it may be stated that the quantity of the base which is employed will range from .05 to 15 moles per mole of the starting ether. When the alcohol is methanol and the base is a strong base, as sodium hydroxide, it will be found that .5 to 5 moles, based on the starting ether, is satisfactory in most cases. In a more preferred embodiment amounts in the order of 3 moles are used. When the alcohol contains from 2 to 6 carbon atoms and the base is of the strong type, the amount needed may be in the order of 10 to 15 moles. In those instances where a weak base is used it will be found that larger amounts may be required. The base may be employed in any desired form such as an aqueous solution, an alcoholate or it may be added to the system as a solid or liquid. If an aqueous solution is used it is advantageous that the solution be concentrated in order that the quantity of water in the system will not be excessive.

Any base or basic acting reagent is found to be suitable. Representative bases and basic acting material include hydroxides of alkali metals and alkali earth metals, ammonia and amines including primary, secondary or tertiary amines, quaternary ammonium salts, quaternary ammonium bases and the like. In addition to such bases, various oxides and carbonates of alkali earth metals and alkali metals may also be used. Such bases include calcium carbonate, sodium carbonate, calcium oxide, potassium carbonate and the like. In the preferred embodiment of this invention the base is most advantageously selected from those that may be characterized as the strong type, particularly the hydroxides of alkali metals and tertiary amines. If an organic base is to be used, the greatest advantage is obtained from such bases which are of low molecular weight as triethyl amine, trimethyl amine, tetramethyl ethylene diamine, and the like, as such materials will participate in the reaction more readily.

The process of this invention is found to be operable only when the positions indicated by the R's are occupied. It is further found that the R's may be any alkyl radical. While this invention is in no way dependent upon theoretical considerations, it is believed that when the ether is substituted in the positions indicated by R steric hindrance somehow operates to effect cleavage under the conditions indicated. Accordingly, the R's may be such radicals as methyl, ethyl, propyl, isopropyl, sec-butyl, 1-methylene pentyl, tert-butyl, 2-methyl hexyl, and the like. It is further found that the processes of this invention proceed most rapidly with higher yields as the degree of hindrance increases. Therefore, in the preferred embodiments of this invention the R's are selected from secondary or tertiary alkyl radicals of the type described above with the latter being most preferred.

The R's may be hydrogen or lower alkyl but it should be noted that when the R's are other than hydrogen, lower yields are obtained. Accordingly, the R's may be the same or different and are selected from hydrogen or lower alkyl. With these considerations understood, it may be stated that the final products will contain in the 2- and 6-positions the alkyl radicals which are contained in the 2- and 6-positions of the starting ether.

The temperatures at which the reaction is conducted ranges from above about 150° C. but below the temperature at which substantial decomposition occurs. In the preferred embodiment temperatures ranging from about 175° C. to about 250° C. are employed because such a temperature range affords the greatest yields in most instances. In general, temperatures in excess of about 350° C. should be avoided because dealkylation will occur in the 2- and 6-positions resulting in a complex mixture of reaction products. Further, temperatures in the order of 300° C. and higher normally are unnecessary.

The process of this invention also employs elevated pressures which may be made dependent on the temperature. In the preferred embodiment the pressure which is employed may be the pressure created by the system, i. e. autogeneous pressures. If desired, higher pressures may be employed as the pressure is not an important consideration in the processes of this invention.

The time required for the reaction to be completed will depend upon the nature of the several variables described above, but in general it will range from one to four hours. In the most preferred embodiments of reactants and conditions of reaction it will be found that the reaction is substantially complete in about two hours or less.

The process of this invention may, in some instances, be advantageously conducted in the presence of a hydrogenation-dehydrogenation catalyst. Such catalysts are found to hasten the reaction but the degree to which the reaction is speeded up is not very great and the cost of the catalyst and the additional effort required to separate it from the reaction product may offset any advantage obtained in decreasing the reaction time. However, a hydrogenation-dehydrogenation catalyst may be advantageously utilized where it is desired to conduct the reaction at temperatures in the order of 300° C. or higher as dealkylation will be somewhat minimized. However, as indicated above, operation at temperatures above 300° C. is, in most instances, unnecessary. Among the suitable hydrogenation-dehydrogenation catalysts there may be mentioned copper, cadmium, silver, vanadium salts or oxides, iron-molybdenum oxides, tungsten-molybdenum oxides, and the like.

After the reaction is complete, the reaction product is separated by any conventional means such as by extraction with inert solvents such as benzene, toluene, xylene, n-pentane, isooctane, dimethyl ether and the like. The excess alcohol is recovered for reuse in subsequent batches.

The starting 2,6-dialkyl-4-alkoxyalkyl phenol may be derived from any source. One method for their preparation comprises the reaction of 2,6-dialkyl phenol, an alcohol and an aldehyde in the presence of a base at temperatures ranging from 35° C. to 100° C. with 40 to 70° C. being preferred. Such a method for the preparation of the starting material is given in detail in Example I.

*Example I*

To a reaction vessel equipped with a agitator, thermometer, reflux condenser and heating and cooling means are charged 1 mole of 2,6-di-tert-butylphenol, 1.06 moles of formaldehyde as 37% formalin, 7.5 moles of methanol, .66 mole water, excluding the water in the formalin, and sufficient sodium hydroxide to raise the pH to 9.0. The temperature is raised to 45° C. and maintained within the range of 40 to 49° C. for 60 minutes. By flashing the reaction product in a Claisen distillation column at about 140° C. at 4 mm. Hg 26% of 4-methoxymethyl-2,6-di-tert-butylphenol is recovered, which is about a 29% conversion of the phenol. The by-product amounts to about 3 mole-percent of the reaction product. By reacting the same mixture for 6½ hours, 65 mole-percent of the ether is obtained which amounts to an 81 molar conversion of the starting phenol. There is, however, 16 mole-percent of by-product formed.

The above described process for preparing a representative starting material for the process of this invention is capable of numerous modifications not only in regard to the specific carbonyl compound, alcohol, 2,6-dialkyl phenol and base but also in regard to the quantities employed and the conditions of reaction. With 2,6-dialkyl-4-alkoxyalkyl phenol as the starting material the process of this invention is conducted as illustrated in the following examples which are intended as illustrations of the inventive process.

*Example II*

.2 mole, 50 gms., of 2,6-di-tert-butyl-4-methoxymethyl phenol, 0.3 mole, 16 gms, of sodium methoxide and 200 moles of methanol are heated and shaken in a sealed steel vessel. The vessel and its contents are heated at 200° C. for about 4 hours at autogenic pressure. The total pressure at the end of the reaction is about 550 p. s. i. g. After 4 hours, the reaction product is removed from the vessel, washed with water and extracted with diethyl ether. The ether is then evaporated to yield about 43 grams of product, 35 grams of which is substantially pure 2,6-di-tert-butyl para-cresol, B. P. 105–7° C. (3 mm. Hg), M. P. 69–70° C. The remainder comprises unreacted ether and an unidentified material.

*Example III*

The procedure of Example II is repeated except that the reaction is conducted for 2 hours using sodium hydroxide. Substantially the same results are obtained.

*Example IV*

The procedure of Example II is repeated using 2,6-diisopropyl-4-ethoxymethyl phenol (prepared from 2,6-diisopropylphenol, acetaldehyde and methanol according to the procedure of Example I). The final product is identified as 2,6-diisopropyl-4-methyl phenol.

Example V

The procedure of Example II is repeated using 2,6-dimethyl-4-methoxymethyl phenol and temperatures ranging from 250–265° C. The final product is identified as 2,4,6-trimethyl phenol.

Example VI

In the same manner as above, 2,6,-di-tert-butyl-4-(1-ethoxyethyl) phenol is reacted with ethanol at 200° C. for 2 hours. The final product is 2,6-di-tert-butyl-4-ethyl phenol but the yields are somewhat lower than obtained in Example II.

Example VII

The procedure of Example II is repeated using 2,6-diisopropyl-4-(1-methoxyethyl)phenol and propanol at temperatures of 250° C. There is obtained 2,6-diisopropyl-4-ethyl phenol in a somewhat lower yield.

Example VIII

The procedure of Example II is repeated in three separate experiments using potassium carbonate, ethylene diamine and tetramethyl ammonium hydroxide, respectively, instead of sodium methoxide. The same product is obtained in lower yields.

Example IX

The procedure of Example III is repeated except that copper is present throughout the reaction. The reaction is substantially complete in about 90 minutes. Companion experiments are conducted at temperatures ranging from 300° C. to 350° C. In all cases mixed products are obtained which is attributed to dealkylation in the 2-and/or 6-positions. When the same experiments are conducted in the presence of copper, dealkylation also occurs but the degree of such dealkylation is considerably less.

From the foregoing it will be observed that the present process is capable of considerable variation without departing from the substance and spirit of the invention.

We claim as our invention:

1. In the preparation of 2,4,6-substituted alkyl phenols, the improvement which comprises reacting an ether of the formula

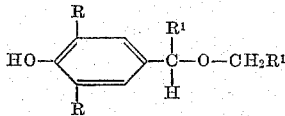

wherein the R's are alkyl and the $R^1$'s are selected from the group consisting of hydrogen and lower alkyl, said reaction being conducted in the presence of at least one equimolar amount of a primary alcohol and more than about 0.05 mole of base per mole of ether, at temperatures between about 150° C. and 350° C. and at a pressure sufficient to retain the reactants in the liquid state.

2. The process of claim 1 in which the base is an alkali metal hydroxide.

3. The process of claim 1 in which the alcohol is methanol.

4. The process of claim 1 in which the alcohol is ethanol.

5. The process of claim 1 in which the alcohol is propanol.

6. The process of claim 1 in which the reaction is conducted at a temperature from about 200° C. to about 300° C.

7. In the preparation of 2,4,6-substituted alkyl phenols, the improvement which comprises reacting an ether of the formula

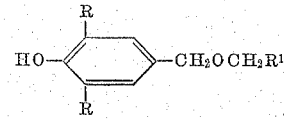

wherein the R's are alkyl and $R^1$ is selected from the group consisting of hydrogen and lower alkyl, said reaction being conducted in the presence of at least an equimolar amount of an alkanol having 1 to 6 carbon atoms and more than about 0.05 mole of base per mole of ether, at temperatures between about 150° C. and 350° C. and at a pressure sufficient to retain the reactants in their liquid state.

8. The process of claim 7 in which the alcohol is methanol.

9. The process of claim 7 in which the base is an alkali metal hydroxide.

10. The process which comprises reacting 2,6-dialkyl-4-methoxymethyl phenol with methanol in the presence of a base, said reaction being conducted at temperatures ranging from about 150° C. to about 300° C., the alcohol being present in molar excess of the ether, thereafter separating the product 2,6-dialkyl para-cresol.

11. The process of claim 10 in which the reaction is conducted at temperatures ranging from about 200° C. to about 250° C.

12. The process of claim 10 in which the alcohol is present from about 10 to 50 moles, based on the 2,6-dialkyl-4-methoxymethyl phenol.

13. The process of claim 10 in which the base is an alkali metal hydroxide.

14. The process of claim 10 in which the ether is 2,6-di-tert-butyl-4-methoxymethyl phenol and the final product is 2,6-di-tert-butyl para-cresol.

References Cited in the file of this patent

Burwell, Jr.: Chem. Rev., vol. 54 (1954), pages 661, 662 (2 pages).